No. 640,077. Patented Dec. 26, 1899.
E. A. BAGBY.
MEANS FOR IRRIGATION AND DRAINAGE.
(Application filed May 16, 1899.)
(No Model.)

WITNESSES:

INVENTOR
Eugene A. Bagby
ATTORNEYS.

UNITED STATES PATENT OFFICE.

EUGENE A. BAGBY, OF WINCHESTER, KENTUCKY.

MEANS FOR IRRIGATION AND DRAINAGE.

SPECIFICATION forming part of Letters Patent No. 640,077, dated December 26, 1899.

Application filed May 16, 1899. Serial No. 717,025. (No model.)

*To all whom it may concern:*

Be it known that I, EUGENE A. BAGBY, of Winchester, in the county of Clark and State of Kentucky, have invented a new and Improved Means for Irrigation and Drainage, of which the following is a full, clear, and exact description.

The object of the invention is to provide a new and improved means for irrigation and drainage which is readily applied to growing plants in pots on greenhouse-benches or to level or sloping ground and arranged to insure a uniform distribution of the water, so that all the growing plants receive a predetermined share of moisture, as needed, to facilitate their growth, and whereby water from a heavy rainfall is automatically stored and distributed for use during a subsequent dry season.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
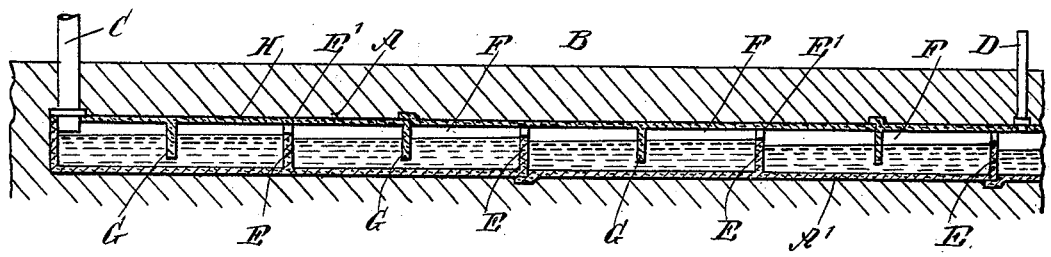
Figure 2:
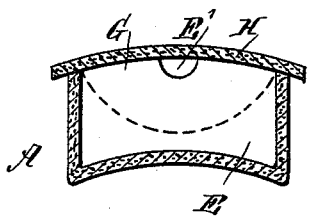
Figure 3:
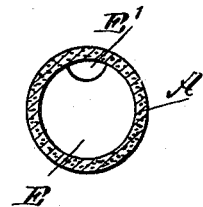
Figure 4:
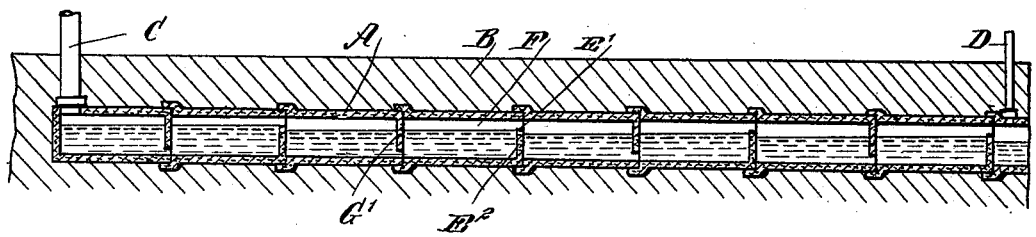
Figure 5:
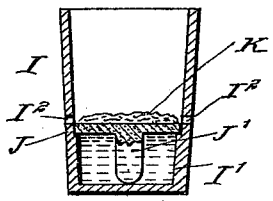

Figure 1 is a sectional side elevation of the improvement as arranged for the subirrigation of land. Fig. 2 is an enlarged transverse section of the improvement. Fig. 3 is a like view of a modified form of the same. Fig. 4 is a sectional side elevation of another modified form of the improvement as arranged for the subirrigation of land, and Fig. 5 is a sectional side elevation of the improvement in the form of a pot for growing plants.

As shown in Figs. 1 and 4, a pipe A, preferably made in sections and of a suitable material, is placed on the surface or at the desired distance in the ground B below the top surface thereof, and this pipe is preferably closed at its ends and is connected at one of the ends with a supply-pipe C, leading to a suitable water-supply for furnishing the desired amount of water to the pipe to fill the same, as hereinafter more fully described, the water-supply being in the form of a movable or permanent tank or other device. The other end of the pipe is provided with an upwardly-extending air-vent or indicating pipe D for allowing air to escape from the pipe A to insure a proper filling with water and also to indicate when the pipe A is filled with water; but the pipe D may be left off for drainage purposes.

The pipe A is preferably made in sections and is provided with transverse partitions E, placed a suitable distance apart to form compartments F, connected with each other at the top by openings E' in the partitions, as is plainly indicated in the drawings. By this arrangement the partitions serve as overflows for the water from one compartment to the next following one to fill the several compartments in the pipe A with an equal amount of water from the tank or other water-supply, the water when the pipe is filled rising in the pipe D to indicate to the observer that the pipe A is full. Any desired cross-sectional form may be given to the pipe A, as indicated in Figs. 2 and 3, and any desired number of partitions may be arranged in a section or only one partition in two adjacent sections, as indicated in Fig. 4.

The exit for the water from each compartment into the surrounding ground is by means of the joints of adjacent sections, said sections being loosely jointed the same as are ordinary trench-tiles, or the sections may be perforated to allow escape of water, or the sections may be made of a porous material which allows the water to pass from the pores through the surrounding ground. By the means mentioned a slow escape of the water is had to insure a proper and uniform moistening of the surrounding ground and to keep the same moist for a considerable length of time without a refilling of the pipe in the manner above described. It is understood that when the pipe is filled from the supply each compartment F receives an amount of water corresponding to that in the other compartments, and as the water drains from each compartment separately it is evident that a uniform moistening of the ground takes place throughout the system.

In order to further insure a moistening of the overlying soil, I extend into the water in each compartment F a lug, post, partition, or the like device G, made of a porous material and depending from the top H of the pipe, and which top is preferably made separate from the body of the pipe, as indicated in Fig. 2. The depending device G, as well as the top H, is in this case made of a porous material, so that the device G readily absorbs the water from the compartment and delivers the same by capillary attraction to the top H, which in turn delivers it to the overlying soil, so as to keep the soil in a proper moist condition. It is understood that this depending device G does not interfere to any extent with the uniform distribution of the water in the several compartments of the pipe.

The construction last described permits of accumulating and storing water from a heavy rainfall in the pipe A, it being understood that by having the porous top and joints of porous tile the water is readily absorbed and passed into the pipe to accumulate and be stored in the several compartments F for distribution by leakage, as above described, during a subsequent dry season.

From the foregoing it is evident that the pipe A may be readily placed in level or sloping ground, as each compartment, owing to the formation of the partitions, will hold the desired amount of water for distribution to its surroundings in the manner above specified.

In Fig. 5 the pot I is provided in its lower portion with a water-receptacle I', closed on top by a porous cover J, having a depending lug J' extending in the water in the receptacle I' to cause the water to pass by capillary attraction to the cover and to the ground above the same to furnish to the growing plant in the said ground a regulated supply of water to promote the growth of the plant. Apertures $I^2$ are arranged in the side wall of the pot I, above the cover J, for the escape of water when the compartment is filled to overflowing. The cover is preferably set on a shoulder formed in the wall of the pot. On the top of the cover is preferably placed a spongy material K—such as forms paper or fabric, straw, &c.—to prevent the ground in the pot from clogging the pores in the cover J and to readily absorb the moisture from the latter and give it off to the ground.

Having thus fully described my invention, I claim as new and desire to secure by Letters Patent—

1. Means for irrigation, provided with a water-receptacle, and a porous cover or top having a depending porous device for causing the water to be passed by capillary attraction into the said cover and from the latter into the ground on top of the cover, substantially as shown and described.

2. Means for irrigation, provided with a water-receptacle, and a porous cover or top having a depending porous device for causing the water to be passed by capillary attraction into the said cover, and a spongy material on the said cover to absorb the water from the latter and deliver it to the ground above, the said material preventing the ground from clogging the pores of the cover, substantially as shown and described.

3. Means for irrigation, consisting of an irrigating-pipe having spaced, transverse overflow-partitions to form compartments connected with each other at the top, each succeeding compartment being filled by overflow from a preceding compartment, and each compartment having means for a slow escape of the water from the compartment, substantially as shown and described.

4. Means for irrigation, consisting of an irrigating-pipe having transverse, spaced overflow-partitions to form compartments connected with each other at the top, a supply-pipe opening into one end of said irrigating-pipe, and a vent and indicating pipe leading from the other end of said irrigating-pipe, substantially as shown and described.

5. Means for irrigation, consisting of an irrigating-pipe connected at one end with a water-supply and having spaced, transverse overflow-partitions to form compartments connected with each other at the top, said pipe having a top made of a porous material, and devices of like material depending from the top into said compartment, to absorb the water contained in the compartment and deliver the same by capillary attraction to the porous top, substantially as shown and described.

6. Means for irrigation, consisting of an irrigating-pipe connected at one end with a water-supply and having spaced, transverse overflow-partitions to form compartments connected with each other at the top, said pipe having a top made of a porous material, devices of like material depending from the top into said compartment, to absorb the water contained in the compartment and deliver the same by capillary attraction to the porous top, said irrigating-pipe also having means for a slow escape of the water from the pipe through the body thereof, as set forth.

EUGENE A. BAGBY.

Witnesses:
R. O. FITCH,
JOHN E. BEAN.